(12) United States Patent
Bhogal et al.

(10) Patent No.: US 8,495,149 B2
(45) Date of Patent: Jul. 23, 2013

(54) OFF-LINE SMARTPHONE FILE SYSTEM SNAPSHOTS

(75) Inventors: Kulvir Singh Bhogal, Pflugerville, TX (US); Ryan Gabriele, Hoboken, NJ (US); Robert Ross Peterson, Austin, TX (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 12/121,270

(22) Filed: May 15, 2008

(65) Prior Publication Data

US 2009/0287777 A1 Nov. 19, 2009

(51) Int. Cl.
*G06F 15/16* (2006.01)
(52) U.S. Cl.
USPC ............... 709/206; 709/203; 709/236
(58) Field of Classification Search
USPC ........................................ 709/206
See application file for complete search history.

(56) References Cited

U.S. PATENT DOCUMENTS

| 6,941,310 B2 | 9/2005 | Ahad et al. |
| 2002/0010748 A1* | 1/2002 | Kobayashi et al. ........... 709/206 |
| 2002/0019851 A1 | 2/2002 | Pollack |
| 2004/0249934 A1 | 12/2004 | Anderson et al. |
| 2006/0155811 A1 | 7/2006 | Goh et al. |
| 2006/0265458 A1* | 11/2006 | Aldrich et al. ............... 709/206 |
| 2007/0135095 A1 | 6/2007 | Barker et al. |

FOREIGN PATENT DOCUMENTS

| EP | 1071029 A2 | 1/2001 |
| EP | 1883042 A1 | 1/2008 |
| JP | 2006209495 A | 8/2006 |
| JP | 2007141134 A | 6/2007 |

OTHER PUBLICATIONS

The International Search Report and The Written Opinion of the International Searching Authority. Date of the actual completion of the international search: Jul. 20, 2009.
Mexico No. MX/a/2010/012339 Office Action dated Sep. 15, 2011. Instituto Mexicano de la Propiedad Industrial.

* cited by examiner

*Primary Examiner* — Wing F Chan
*Assistant Examiner* — David X Yi
(74) *Attorney, Agent, or Firm* — Mollborn Patents, Inc.; Frederik Mollborn

(57) ABSTRACT

Methods and apparatus, including computer program products, implementing and using techniques for distributing a file by email from a mobile device. An email is composed on the mobile device. A user selection is received of a file to be attached to the email. The selection is made from an off-line snapshot of a remote file system in which the file is located. A link corresponding to the location of the file in the remote file system is embedded into the email. The email with the link is placed in a queue on the mobile device. The email with the file corresponding to the link is sent in response to the remote file system becoming available to the mobile device.

21 Claims, 2 Drawing Sheets

OFF-LINE SMARTPHONE FILE SYSTEM SNAPSHOTS

BACKGROUND

This invention relates to data synchronization for mobile devices. Mobile devices, such as cellular telephones are getting increasingly advanced. Recently, so-called smartphones, such as the iPhone by Apple Computers and the BlackBerry by RIM have become increasingly popular. In contrast to a conventional cellular telephone, smartphones typically offer advanced capabilities beyond the capabilities of a typical cellular phone, often with a PC-like functionality. For example, most smartphones support full featured email capabilities with the functionality of a complete personal organizer. Other types of functionality can include an additional interface, such as a miniature QWERTY keyboard, a touch screen, a built-in camera, contact management, navigation hardware and software, the ability to read business documents of various formats (e.g. PDF and Microsoft Office files), Internet browsers, music players, and so on.

For e-mail applications, many of the smartphones use a push-based e-mail approach. There are many ways in which push-based email can be realized, but essentially push-based email works as follows. When an email comes in to the server hosting the user's email account, the server sends out a message (e.g., a text message) to the smartphone or mobile device associated with the email account, telling the smartphone that the smartphone needs to synchronize with the server. The smartphone then initiates a synchronization process with the server and downloads any new emails for the user to the smartphone. In other solutions, the email itself is simply pushed to the recipient, rather than pushing a notification.

When sending an email that the user composes on the smartphone, the smartphone connects to the mail server and transfers the email to the mail server, which in turn sends out the email to the appropriate recipient. Often, when the user sends an email using a smartphone, he wishes to attach a file to the e-mail. In current systems, any attachments for an email must reside either on the mail server, or on the smartphone itself. This could be a problem, for example, if the user wishes to send an attachment that resides on the user's laptop hard drive. In such a situation, the user does not have any visibility to reference their laptop hard drive from the smartphone. Thus, there is a need for improved mechanisms for email use of smartphones and similar mobile devices.

SUMMARY

In general, in one aspect, the invention provides methods and apparatus, including computer program products, implementing and using techniques for distributing a file by email from a mobile device. An email is composed on the mobile device. A user selection is received of a file to be attached to the email. The selection is made from an off-line snapshot of a remote file system in which the file is located. A link corresponding to the location of the file in the remote file system is embedded into the email. The email with the link is placed in a queue on the mobile device. The email with the file corresponding to the link is sent in response to the remote file system becoming available to the mobile device.

Advantageous implementations can include one or more of the following features. A snapshot of the remote file system can be created and the snapshot can be sent to the mobile device as part of a synchronization operation. The mobile device can be a cellular telephone or a personal digital assistant. The off-line snapshot can include only a portion of the remote file system. The remote file system can become available to the mobile device through a wired connection or a wireless connection between the mobile device and a device hosting the remote file system.

It can be determined whether the file selected by the user from the off-line snapshot has been modified since the off-line snapshot was created. In response to determining that the file has been modified, the user can be notified about the modification of the file. It can be determined whether the location of the file selected by the user from the off-line snapshot has changed since the off-line snapshot was created. In response to determining that the location of the file has changed, the user can be notified that the file is no longer available at the specified location.

In general, in one aspect, the invention provides methods and apparatus, including computer program products, implementing and using techniques for distributing a file by email from a mobile device. An email is composed on a mobile device. The email has at least one addressee. A user selection of a file to be attached to the email is received. The selection is made from an off-line snapshot of a remote file system in which the file is located. A link corresponding to the location of the file in the remote file system is embedded into the email. The email is sent to the addressee without the file corresponding to the link. An instruction is sent from the mobile device to an email client with access to the remote file system. A second email to the addressee is automatically composed by the email client. The second email includes the file corresponding to the link. The second email with the file is sent to the addressee.

The invention can be implemented to include one or more of the following advantages. A user will have visibility into file systems that do not reside on the mobile device or its server, such as local hard drives on desktops or laptops, or a combination thereof. The user can embed links to any files residing on such local hard drives to emails that are composed on the mobile device, and the emails can be queued and sent out when the files become available to the mobile device. This provides more flexibility for the user.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Overview

Figure 1:
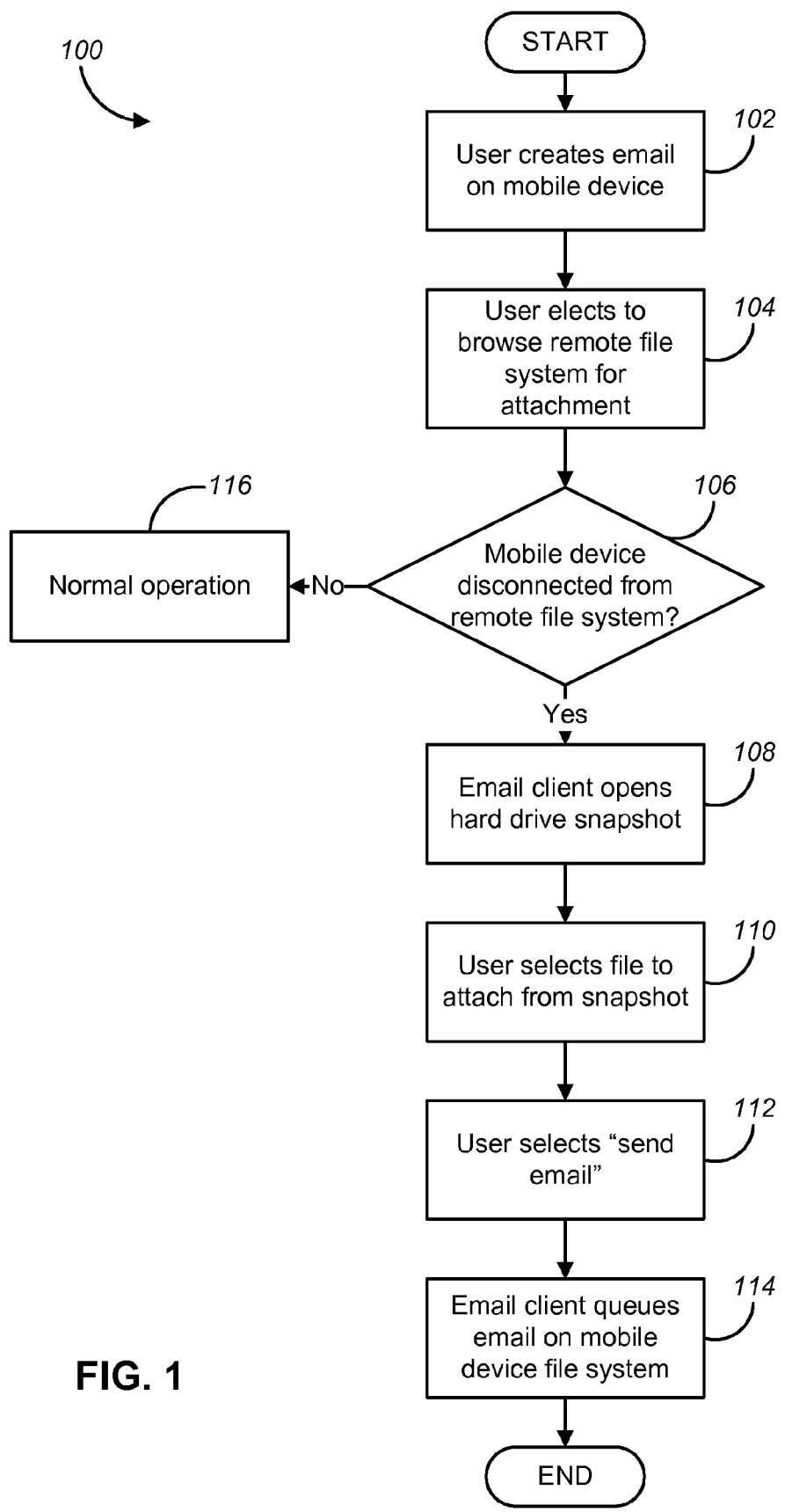
FIG. 1 shows a process for composing an email with an attachment in accordance with one embodiment of the invention.

The various embodiments of the invention described herein pertain to improved email capabilities of smartphones and similar types of mobile devices. In particular, the various embodiments of the invention allow a smartphone or other mobile device to receive a snapshot or file digest of a user's hard drive, for example, on a laptop or desktop computer, when a synchronization operation occurs between the smartphone and the device with the hard drive. The snapshot or file digest allows the user to view the file information for the hard drive, but the files themselves are not copied to the smartphone.

Depending on the user's choices, the snapshot can be for the complete hard drive, or only for a subset of the hard drive (for example, a "My Documents" folder, or similar portion). As a result, the various embodiments of the invention allow a user to send an e-mail out using their smartphone and embed a link acquired from the off-line snapshot into the email. Emails with attachment links are held in a queue on the mail server until the actual attachment can be obtained from the hard drive, for example, when the user connects the smartphone and device with the hard drive through BlueTooth, Infrared, cable hardwire, or a similar connection mechanism. Alternatively, the email can be sent out without the attachment from the mobile device, and a message can be sent by the mobile device to the email server with instructions to send out a particular attachment to a particular recipient.

Compared to existing methods, the ability to obtain snapshots of local hard drives improves the flexibility for the user, as the user may compose emails on his mobile device with attachments that do not reside on the mail server or the mobile device itself. That is, the user has visibility into one or more disk volumes that are not accessible from the mobile device in conventional solutions.

Various embodiments of the invention will now be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 shows a process (100) for composing an email with an attachment in accordance with one embodiment of the invention. As shown in FIG. 1, the process starts by a user creating an email on his mobile device (step 102). The user then elects to browse a remote file system, such as a laptop hard drive, for a file that he wishes to attach to the email (step 104). The process then determines whether the mobile device is disconnected from the remote file system (step 106). This can be done, for example, by a so-called "handshake" between the mobile device and the remote file system, as is well known to those of ordinary skill in the art. If it is determined that the mobile device connected to the system, normal operation proceeds (step 116), as is well known to those of ordinary skill in the art.

However, if it is determined in step 106 that the mobile device is disconnected from the remote file system, for example, through a lack of a handshake over a predetermined period of time, the email client on the mobile device opens a hard drive snapshot (step 108). The snapshot represents information about the organization of the remote file system at the time of the latest synchronization between the user's mobile device and the remote file system. That is, the file system snapshot allows the user to see the names and locations of the files that were present on the remote file system (or a portion thereof) at the latest synchronization, although the files themselves are not copied to the mobile device, but are still located in their original locations on the remote file system. In some implementations, the remote file system can send updates about the file structure over the air, whereas in other implementations, the snapshot can occur in the background while the mobile device is connected to the remote file system, thorough any conventional connection means, such as Bluetooth, Infrared connection, cable hardwire, or similar types of technologies. It should be noted that while this description refers to a single snapshot, it is possible to have multiple snapshots, reflecting different remote file systems, on the mobile device. For example, there might be a "my laptop" snapshot, a "my desktop" snapshot, and a "my work station" snapshot, and so on, enabling the user to select files from any of these devices.

The user then selects the file to be attached to the email from the remote file system snapshot (step 110). This causes a link specifying the location of the file, acquired from the remote file system snapshot, to be embedded into the email. The user then selects a "send email" option in his email client on the mobile device (step 112). This causes the email client to place the email into a queue on the mobile device file system (step 114), where the email sits until the attachment can be obtained from the remote file system, as will be described in further detail below with reference to FIG. 2. This ends the process (100).

Figure 2:
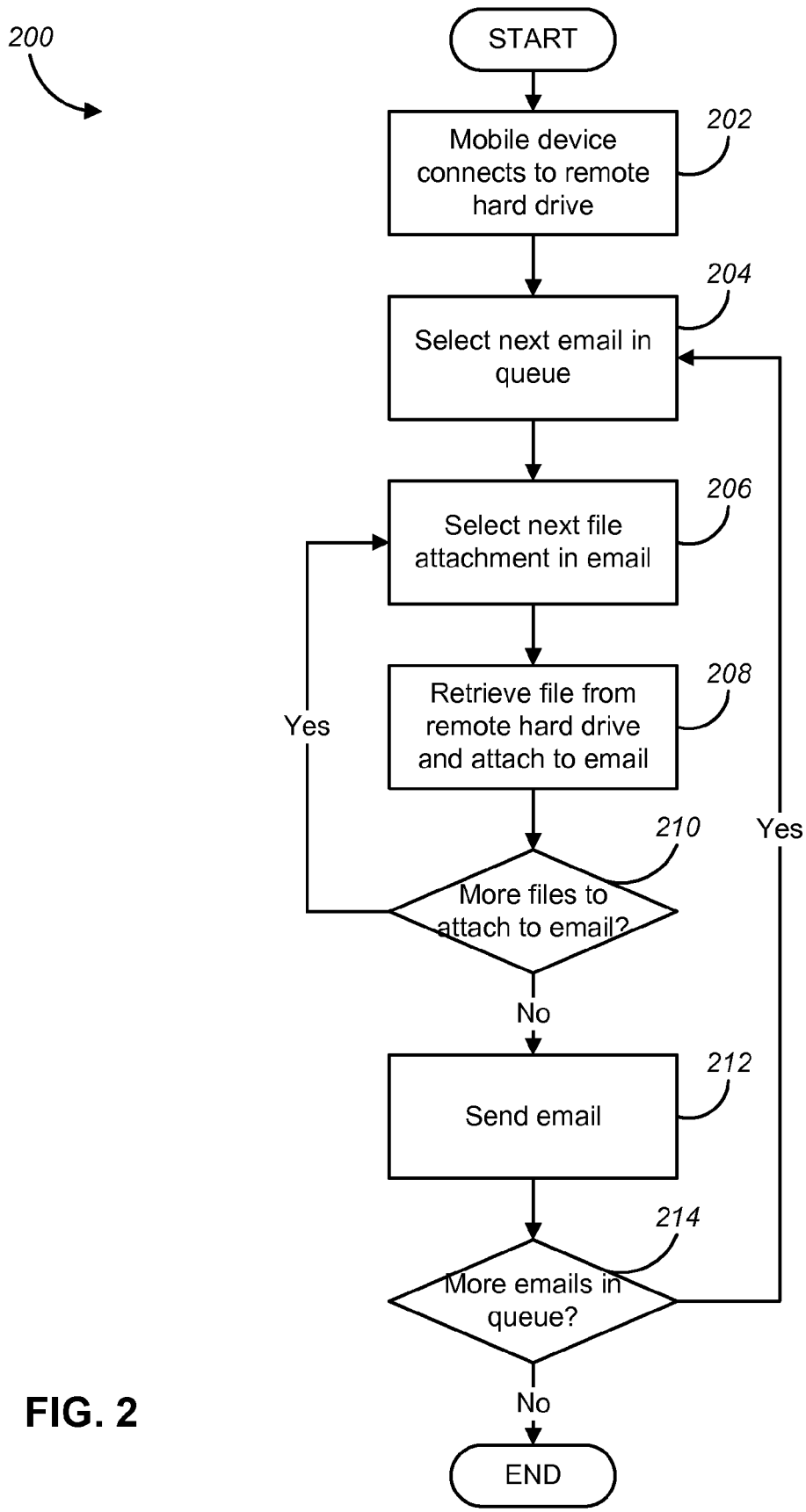
FIG. 2 shows a process for sending queued emails with attachments from a mobile device in accordance with one embodiment of the invention.

FIG. 2 shows a process (200) for sending one or more queued emails with one or more attachments from a mobile device in accordance with one embodiment of the invention. As can be seen in FIG. 2, the process starts by the mobile device connecting to the remote file system (step 202). The connection can be made using any conventional connection means, such as Bluetooth, Infrared connection, cable hardwire, and so on, as are familiar to those of ordinary skill in the art. Once the connection has been established, the first email in the queue on the mobile device is selected (step 204), and the first email attachment is selected (step 206). The attachment specified by the link in the email is then retrieved from the remote hard drive and is attached to the email (step 208). It is then examined whether there are any further files to attach to the email, based on the links within the email (step 210). If there are more files to attach to the email, the process returns to step 206, and repeats steps 206-210 until it is determined in step 210 that there are no further attachments to the email. The email is then sent (step 212).

After sending the email, the process examines whether there are any further emails in the queue waiting to be sent (step 214). If there are more emails in the queue, the process returns to step 204, where the next email in the queue is selected, and steps 206 through 214 are repeated until it is determined in step 214 that there are no more emails in the queue. This ends the process (200).

As the skilled reader realizes, there can be many variations based on the processes described above. For example, in some implementations, instead of queuing the email, the e-mail can be sent, but without the attachment. Rather, an e-mail instruction is sent to the user's e-mail server. The user's mail client on their desktop receives the e-mail instruction and composes an e-mail that contains the attachment from the user's hard drive. This e-mail can then automatically be sent out from the user's mail client. Alternatively, the user can a receive a prompt on his mobile device, such as "You sent an e-mail out specifying that the file c:\attachments\clientproposal.doc be sent to Robert Peterson as an attachment, would you like to send this attachment now?"

In cases where the file system has changed, which may, for example, be the case if changes to the file system occurred since the last snapshot was taken, the email application can state "You sent an e-mail out specifying that the file c:\attachments\clientproposal.doc" be sent to Robert Peterson. This file no longer exists at this location. Please specify the new location of the file."

In some implementations, the mail application can verify that the file to be attached to the email has not been modified since the snapshot was taken. If it turns out that the file was modified, the mail application may prompt the user using a notification such as "You sent an e-mail out specifying that the file c:\attachments\clientproposal.doc be sent to Robert Peterson. This file has changed since you last synchronized your file system to your smart phone device, would you still like to send this file?", thereby ensuring that the user attaches the appropriate version of the file to the email.

The synchronization of the mobile device and the remote file system can occur in a variety of ways. For example, in some implementations, a hook is added to the mobile device's synchronization runtime. That is, every time a user sends an email with an attachment and the mobile device is not connected to the target hard drive or remote file system, a new entry in a file-based queue is created with the file system information targeting the attachment. When synchronization occurs at a later time, the hook code fetches all the attachments in the queue from the remote file system and then passes them to the email client to be sent.

The flowchart and block diagrams in the figures referred to above illustrate the architecture, functionality, and operation of possible implementations of systems, methods and computer program products according to various embodiments of the invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, various embodiments of the invention can include a system, method or computer program product. Accordingly, the invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention can take the form of a computer program product embodied in any tangible medium of expression having computer-usable program code embodied in the medium.

Any combination of one or more computer usable or computer readable medium(s) can be used. The computer-usable or computer-readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, or transport the program for use by or in connection with the instruction execution system, apparatus, or device.

Computer program code for carrying out operations of the invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

A number of implementations of the invention have been described. Nevertheless, it will be understood that various modifications may be made without departing from the spirit and scope of the invention. For example, the above discussion has referred to mobile phones, but is equally applicable to other types of devices, such as personal digital assistants (PDAs), and so on. The mobile device can also contain multiple snapshots. For example, there can be different snapshots for different devices, such that there is a "my laptop" snapshot, a "my home desktop" snapshot, a "my work desktop" snapshot and so on. This would enable the mobile device to perform the above-mentioned operations with respect to any of the remote file systems reflected by the snapshots, based on the user's selection, and give the user the possibility to view the files on multiple devices using a single mobile device. Accordingly, other embodiments are within the scope of the following claims.

The invention claimed is:

1. A computer-implemented method for distributing one or more files by email from a mobile device, the method comprising:

receiving, as part of a local synchronization operation between the mobile device and a local computer, a snapshot of a hard drive in the local computer, the snapshot including a list of files stored in the hard drive;

composing an email on the mobile device;

determining whether the mobile device is currently connected to the local computer;

in response to a determination that the mobile device is not currently connected to the local computer, opening the received snapshot;

receiving a user selection of one or more files to be attached to the email, the selection being made from the list of files included in the received snapshot;

embedding one or more links into the email identifying the location on the hard drive of the user selected one or more files;

placing the email with the embedded one or more links in a queue on the mobile device;

in response to the hard drive becoming available to the mobile device, attaching the user selected files to the email; and sending the email.

2. The method of claim 1, wherein the mobile device is one of: a cellular telephone and a personal digital assistant.

3. The method of claim 1, wherein the off-line snapshot includes only a portion of the hard drive.

4. The method of claim 1, wherein the hard drive becomes available to the mobile device through a wired connection or a wireless connection between the mobile device and the local computer.

5. The method of claim 1, further comprising:

determining whether the file selected by the user from the off-line snapshot has been modified since the off-line snapshot was created; and in response to determining that the file has been modified, notifying the user about the modification of the file.

6. The method of claim 1, further comprising:

determining whether the location of the file selected by the user from the off-line snapshot has changed since the off-line snapshot was created; and in response to determining that the location of the file has changed, notifying the user that the file is no longer available at the specified location.

7. A computer-implemented method for distributing one or more files by email from a mobile device, the method comprising:

receiving, as part of a local synchronization operation between the mobile device and a local computer, a snapshot of a hard drive in the local computer, the snapshot including a list of files stored in the hard drive;

composing an email on a mobile device, the email having at least one addressee;

determining whether the mobile device is currently connected to the local computer;

in response to a determination that the mobile device is not currently connected to the local computer, opening the received snapshot;

receiving a user selection of one or more files to be attached to the email, the selection being made from the list of files included in the received snapshot;

embedding one or more links into the email identifying the location on the hard drive of the user selected one or more files;

sending the email to the addressee, without attaching the user selected one or more files to the email;

sending an instruction from the mobile device to an email client with access to the hard drive;

automatically composing a second email to the addressee by the email client, the second email including one or more attachments with the user selected one or more files; and sending the second email with the one or more attachments to the addressee.

8. The method of claim 7, wherein the mobile device is one of: a cellular telephone and a personal digital assistant.

9. The method of claim 7, wherein the off-line snapshot includes only a portion of the hard drive.

10. The method of claim 7, further comprising:

determining whether the file selected by the user from the off-line snapshot has been modified since the off-line snapshot was created; and in response to determining that the file has been modified, notifying the user about the modification of the file.

11. The method of claim 7, further comprising:

determining whether the location of the file selected by the user from the off-line snapshot has changed since the off-line snapshot was created; and in response to determining that the location of the file has changed, notifying the user that the file is no longer available at the specified location.

12. A computer program product for distributing one or more files by email from a mobile device, the computer program product comprising:

a non-transitory computer usable storage medium having computer usable program code embodied therewith, the computer usable program code comprising:

computer usable program code configured to receive, as part of a local synchronization operation between the mobile device and a local computer, a snapshot of a hard drive in the local computer, the snapshot including a list of files stored in the hard drive:

computer usable program code configured to compose an email on a mobile device;

computer usable program code configured to determine whether the mobile device is currently connected to the local computer;

computer usable program code configured to, in response to a determination that the mobile device is not currently connected to the local computer, open the received snapshot;

computer usable program code configured to receive a user selection of one or more files to be attached to the email, the selection being made from the list of files included in the received snapshot;

computer usable program code configured to embed one or more links into the email identifying the location on the hard drive of the user selected one or more files;

computer usable program code configured to place the email with the embedded one or more links in a queue on the mobile device;

computer usable program code configured to, in response to the hard drive becoming available to the mobile device, attach the user selected files to the email; and computer usable program code configured to send the email.

13. The computer program product of claim 12, wherein the mobile device is one of: a cellular telephone and a personal digital assistant.

14. The computer program product of claim 12, wherein the off-line snapshot includes only a portion of the hard drive.

15. The computer program product of claim 12, wherein the hard drive becomes available to the mobile device through a wired connection or a wireless connection between the mobile device and the local computer.

16. The computer program product of claim 12, further comprising:
   computer usable program code configured to determine whether the file selected by the user from the off-line snapshot has been modified since the off-line snapshot was created; and
   computer usable program code configured to notify the user about the modification of the file in response to determining that the file has been modified.

17. The computer program product of claim 12, further comprising:
   computer usable program code configured to determine whether the location of the file selected by the user from the off-line snapshot has changed since the off-line snapshot was created; and
   computer usable program code configured to notify the user that the file is no longer available at the specified location in response to determining that the location of the file has changed.

18. A computer program product for distributing one or more files by email from a mobile device, the computer program product comprising:
   a non-transitory computer usable storage medium having computer usable program code embodied therewith, the computer usable program code comprising:
   computer usable program code configured to receive, as part of a local synchronization operation between the mobile device and a local computer, a snapshot of a hard drive in the local computer, the snapshot including a list of files stored in the hard drive;
   computer usable program code configured to compose an email on a mobile device, the email having at least one addressee;
   computer usable program code configured to determine whether the mobile device is currently connected to the local computer;
   computer usable program code configured to, in response to a determination that the mobile device is not currently connected to the local computer, opening the received snapshot;
   computer usable program code configured to receive a user selection of one or more files to be attached to the email, the selection being made from the list of files included in the received snapshot;
   computer usable program code configured to embed one or more links into the email identifying the location on the hard drive of the user selected one or more files;
   computer usable program code configured to send the email to the addressee, without attaching the user selected one or more files to the email;
   computer usable program code configured to send an instruction from the mobile device to an email client with access to the hard drive;
   computer usable program code configured to automatically compose a second email to the addressee by the email client, the second email including one or more attachments with the user selected one or more files; and
   computer usable program code configured to send the second email with the one or more attachments to the addressee.

19. The computer program product of claim 18, wherein the off-line snapshot includes only a portion of the hard drive.

20. The computer program product of claim 18, further comprising:
   computer usable program code configured to determine whether the file selected by the user from the off-line snapshot has been modified since the off-line snapshot was created; and
   computer usable program code configured to notify the user about the modification of the file in response to determining that the file has been modified.

21. The computer program product of claim 18, further comprising:
   computer usable program code configured to determine whether the location of the file selected by the user from the off-line snapshot has changed since the off-line snapshot was created; and
   computer usable program code configured to notify the user that the file is no longer available at the specified location in response to determining that the location of the file has changed.

* * * * *